(12) United States Patent
Lilly

(10) Patent No.: US 7,661,225 B2
(45) Date of Patent: Feb. 16, 2010

(54) METHOD FOR ATTACHING SEEDS IN AN AUTOMATED SEEDING SYSTEM

(76) Inventor: James Lilly, 101 Tuttle La., Beth Page, TN (US) 37022

( * ) Notice: Subject to any disclaimer, the term of this patent is extended or adjusted under 35 U.S.C. 154(b) by 26 days.

(21) Appl. No.: 11/011,391

(22) Filed: Dec. 14, 2004

(65) Prior Publication Data
US 2006/0123701 A1    Jun. 15, 2006

(51) Int. Cl.
*A01C 1/06* (2006.01)
(52) U.S. Cl. .................................................. 47/57.6
(58) Field of Classification Search ............. 47/56, 47/57.5, 57.6, 901, 1.01 R, 58.1 R
See application file for complete search history.

(56) References Cited
U.S. PATENT DOCUMENTS

| | | | | |
|---|---|---|---|---|
| 1,399,822 A | * | 12/1921 | Streb | 36/15 |
| 2,648,165 A | * | 8/1953 | Nestor | 47/56 |
| 3,307,293 A | * | 3/1967 | Truax | 47/9 |
| 4,703,704 A | * | 11/1987 | Mielke et al. | 111/179 |
| 5,060,418 A | * | 10/1991 | Pullman et al. | 47/58.1 R |
| 2005/0028440 A1 | * | 2/2005 | Ko | 47/56 |

FOREIGN PATENT DOCUMENTS

| JP | 02177822 A | * | 7/1990 | 47/66.1 |
|---|---|---|---|---|
| JP | 402177822 A | * | 7/1990 | 47/66.1 |

* cited by examiner

*Primary Examiner*—Francis T Palo
(74) *Attorney, Agent, or Firm*—Ronald L. Hofer

(57) ABSTRACT

A method for securing seeds in an automatic seeding process includes the steps of placing individual seeds in pellets in a tray on a conveyor belt and then securing the seeds on each pellet by placing a gel film over each seed so that the pellets can be transported to a greenhouse. The gel film is provided by contacting a gel precursor with a gelling agent in the presence of the seed.

7 Claims, 2 Drawing Sheets

METHOD FOR ATTACHING SEEDS IN AN AUTOMATED SEEDING SYSTEM

BACKGROUND

1. Field

The present invention relates to seeding systems. More particularly, the present invention relates to automated seeding methods and systems wherein a seeding machine sows seeds in growth medium in trays that are then transported to greenhouses for germination encouraged by moisture and warmth.

2. Background Information

Automated seeding and systems are used, for example, in the forest industry for efficient seeding operations. Generally speaking, in an automated seeding method or system, a plurality of trays are carried by a conveyor belt under a seeding machine. Each tray carries a plurality of individual containers and each container has a cavity that contains a growth medium such as vermiculite or peat. When each container is passed under the seeding machine, each seed is accurately placed in the growth medium. The trays are then transported to greenhouses that provide a warm, moist environment for germination of the seeds. However, the transportation of the trays, whether manual or automated, often dislodges and misplaces a substantial number of the seeds. Misplaced seeds are commonly referred to as "off-centers" or "drop-offs" and reduce the efficiency of the process.

It is known to cover seeds with a small amount of vermiculite or grit for keeping moisture around the seed. This technique offers protection against seed desiccation but fails to secure the seeds in place. There remains a need for an improved method of reducing the number of seeds that are dislodged in order to improve the efficiency of automatic seeding operations.

The present invention provides improved efficiency for automated seeding systems. This and other advantages will be appreciated from the following disclosure wherein all parts and percentages are by weight unless otherwise indicated.

SUMMARY OF THE INVENTION

In accordance with the present invention, a method for securing seeds in an automatic seeding process is provided wherein:

(A) a plurality of individual seeds are each placed in a selected location on a horizontal surface of a growth medium; and (B) a gel film is provided over each said seeded location to thereby secure each said seed in position on said horizontal surface of said growth medium.

said gel film being provided by contacting a gel precursor with a gelling agent over each seeded location.

DESCRIPTION OF THE DRAWINGS

FIG. 3 is a cross-sectional view, broken away, illustrating a seed, which has been bound by film on a peat pellet in accordance with a preferred embodiment of the present invention.

DESCRIPTION OF THE INVENTION

Figure 1:
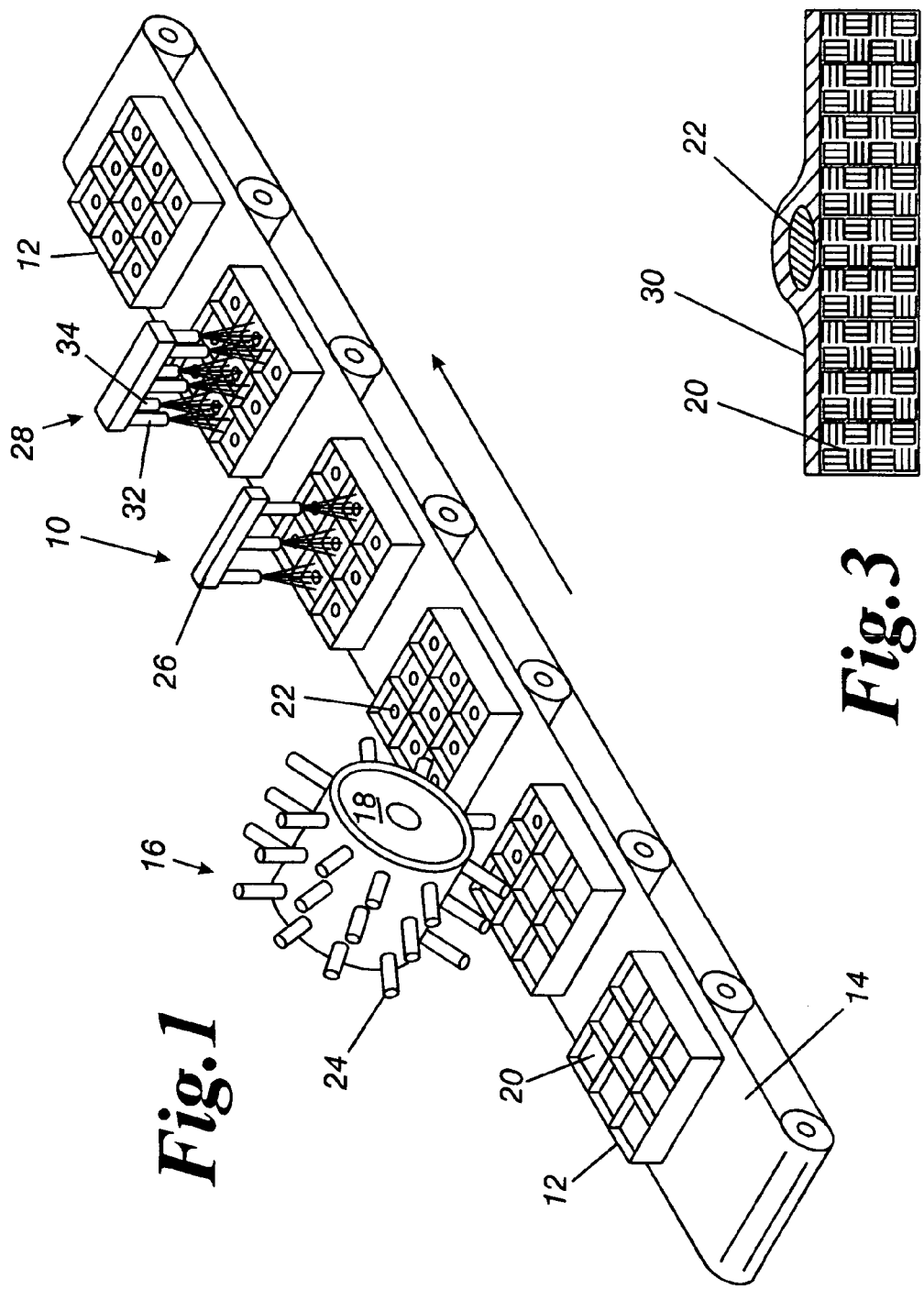
FIG. 1 is a somewhat schematic view illustrating a preferred system of the present invention.

Now referring to FIG. 1, a somewhat schematic diagram showing a system of a preferred method of the present invention is illustrated and indicated generally by the numeral 10.

As shown in FIG. 1 a plurality of trays 12 are carried by conveyor belt 14 for seeding at station 16 by seeding machine 18. Each tray 12 carries a plurality of peat pellets 20 comprising a growth medium for seeds 22. Seeding machine 18 is a conventional seeding machine and has a plurality of tubes 24 which serve to place each individual seed 22 in a selected location on peat pellet 20. It will be appreciated by those skilled in the art that in some cases it may be desirable to place a plurality of seeds, for example, a pair of seeds together in each location and that peat pellets 20 may be carried directly on trays 12 or each pellet may be itself carried by a container which is carried by a tray 12. Furthermore, it will be appreciated that peat pellets 20 may be comprised of alternative suitable growth medium such as vermiculite.

After seeding station 16, trays 12 are passed through an optional watering station 26 and then to fixing station 28. At fixing station 28 a gel film 30 is applied over seeds 22 to secure seeds 22 to peat pellets 20. As illustrated in FIG. 1, fixing station 28 has a first spray nozzle 32 and a second spray nozzle 34. First spray nozzle 32 applies an aqueous solution of a gel precursor onto the selected locations of seeds 22 on peat pellets 20. Then second spray nozzle 34 applies a gelling agent onto the selected locations whereupon the gelling agent comes in contact with the gel precursor solution and interacts therewith to form a gel film 30 over peat pellets 20 and seeds 22 thereby "fixing" seeds 22 onto peat pellets 20. The resulting product is shown in Figure that illustrates in cross-section a peat pellet 20 with seed 22 fixed thereon by gel film 30. Gel film 30 helps retain moisture around the seed, thereby potentially increasing the germination rate.

Suitable gel precursors include high molecular weight molecules that can be cross-linked to form a gel. The gel precursors are natural based polymeric compounds, synthetic polymeric compounds, or a mixture thereof. Exemplary of natural based polymeric compounds are latex natural rubber, polypeptides (i.e., proteins) and polysaccharides (i.e., alginate). Exemplary of synthetic gel precursors that are normally solutions are polyacrylic acid, copolymers of maleic anhydride, methyl vinyl ethers, polyvinyl pyrrolidone, polyvinyl alcohol. Exemplary of synthetic gel precursors that are normally emulsions or dispersions are polyvinyl acetate, and latex rubbers (i.e. styrene-butadiene with a small percentage of a carboxyl group). Suitable gelling agents are well known, and include calcium ions which can be provided as calcium nitrate, calcium citrate or calcium chloride. Of course, other polyvalent ions, such as $Al^{+3}$ and $B^{+3}$ may be suitable depending upon the particular gel precursors. Polyvinyl alcohol or polyvinyl acetate can be cross-linked with borax solution. Polypeptides can be cross-linked by metals or other functional molecules, where the metal interacts with the electronegative functional groups, such as hydroxyl groups, carboxyl groups, and amines. In cases where the gel precursor is an emulsion or dispersion, gelling can be affected through the application of compounds that disrupt the surface tension, causing the micelles to coalesce. Coalescing agents such as ethylene/diethylene glycol 2-ethylhexyl ether can be added to quicken the process.

Alternatively, the aqueous solution of gelling agent may be applied before the gel precursor solution or the gelling agent and the gel precursor may be applied at the same time. Also alternatively, either one of the gelling agent or gel precursor may be applied to the peat pellet in dry form with the other of the gelling agent or gel precursor being applied in aqueous solution. Also alternatively, both the gelling agent and the gel precursor may be applied in dry form and then contacted with water to provide a gelled film over the seed 22 to fix it to peat pellet 20.

Figure 2:
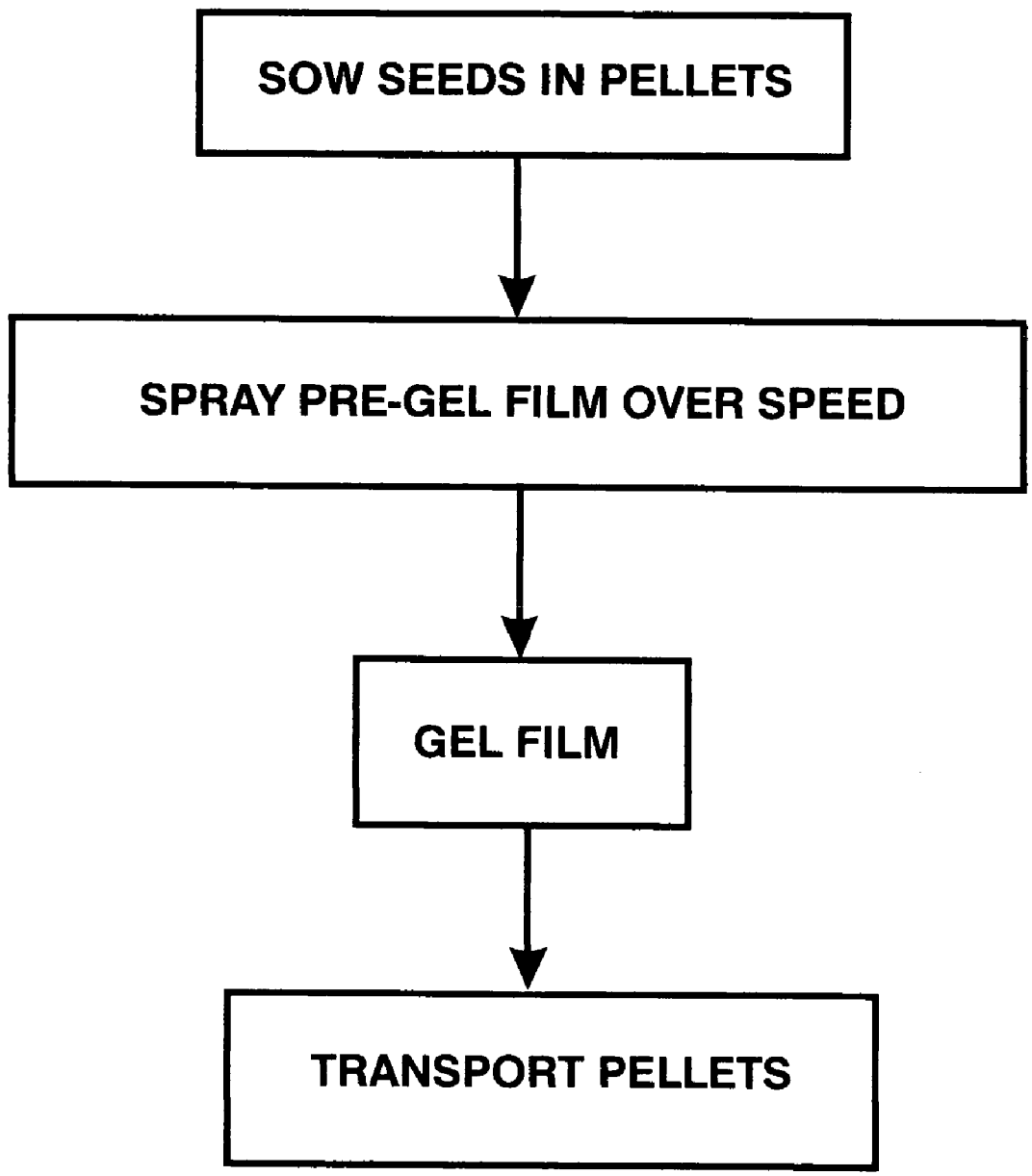
FIG. 2 is a block diagram setting forth the method steps of a preferred embodiment of the present invention.

Now referring to FIG. 2, the method steps of a preferred embodiment of the present invention are broadly set forth in block diagram. Thus, seeds are first sown in peat pellets or other growth medium by selectively placing each seed on an exposed surface of the peat pellet. Then, a gel film and gelling composition are commingled or otherwise mixed and placed in contact with each other in film relationship on the surface of the seed and peat pellet. A gel film is thereby formed over the seed and peat pellet surface to fix the seed thereon. Then the peat pellet with fixed seed thereon is ready for transport to a greenhouse or the like.

Further understanding of the present invention will be had from the following examples.

EXAMPLE 1

An aqueous pre-gel solution is made of the following ingredients:

| ingredient | amount |
| --- | --- |
| alginate (Protonal LF20/40 from FMC Biopolymers) | 2% |
| sugar (dispersant) | 8 |
| sodium benzoate (preservative) | 0.1 |
| potassium sorbate (preservative) | 0.1 |
| water | 89.9 |

All of the above dry ingredients are combined and mixed and dissolved in the water to form an aqueous pre-gel solution. The solution is then further diluted 1:20 to form a 0.1% aqueous solution which is then used in the fixing station and sprayed onto seeds on peat pellets. An aqueous solution of 2% calcium nitrate is sprayed onto the pre-gel solution to form a thin gel film over the seed and peat pellet.

EXAMPLE 2

The following ingredients are mixed together:

| ingredient | amount |
| --- | --- |
| Protonal LF20/40 | 41.2% |
| citric Acid (anhydrous) | 29.4 |
| potassium carbonate (anhydrous) | 29.4 |

The effervescent components act both as a diluent and a dispersant.

EXAMPLE 3

The following dry ingredients are mixed together:

| ingredient | amount |
| --- | --- |
| Protonal LF20/40 | 1% |
| citric acid | 8.5 |
| potassium carbonate | 8.5 |
| calcium nitrate | 2 |
| vermiculite | 80 |

The mixture is placed on the seed dry and then sprayed with water after the seed is sown on the peat pellet. The dry ingredients dissolve in the water and effervesce to disperse the alginate around the seed and vermiculite. The calcium ion (in solution) gels the alginate. This formulation enjoys the advantage that there is no need to mix the product on site and does not use any special equipment to spray the solutions. The product can be applied using the equipment that is already used to apply the vermiculite.

What is claimed is:

1. A method for securing seeds in an automatic seeding process comprising the steps of:
   (A) placing a plurality of individual seeds in selected locations on horizontal surfaces of a growth medium on a conveyor belt; and
   (B) providing a gel film over each said seed to thereby secure each said seed in position on said horizontal surface of said growth medium; and
   (C) transporting said secured seeds to a greenhouse; said gel film being provided by contacting a gel precursor with a gelling agent substantially in the presence of said seed.

2. The method of claim 1 wherein said gel film is provided by the steps of spraying an aqueous solution of a gel precursor and an aqueous solution of a gelling agent onto said seed and growth medium.

3. The method of claim 1 wherein said gel film is provided by the steps of applying a dry gel precursor onto said seed and then spraying an aqueous solution of a gelling agent thereon.

4. The method of claim 1 wherein said gel film is provided by the steps of applying a dry gelling agent onto said seed and then spraying an aqueous solution of a gel precursor thereon.

5. The method of claim 1 wherein said gel film is provided by the steps of applying a dry gelling agent and a dry gel precursor onto said seed and then spraying water thereon.

6. The method of claim 1 wherein said gel precursor is alginate.

7. The method of claim 1 wherein said gelling agent is calcium ion.

\* \* \* \* \*